United States Patent
Wakamatsu

(10) Patent No.: US 8,619,334 B2
(45) Date of Patent: Dec. 31, 2013

(54) DETERMINING CAPABILITY AND AFFECT OF UPSTREAM AND DOWNSTREAM IMAGE FORMING DEVICES AND RESTRICTING OPERATION ACCORDINGLY

(75) Inventor: Jun Wakamatsu, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 300 days.

(21) Appl. No.: 13/091,808

(22) Filed: Apr. 21, 2011

(65) Prior Publication Data

US 2012/0105877 A1    May 3, 2012

(30) Foreign Application Priority Data

Oct. 29, 2010   (JP) ................................. 2010-243348

(51) Int. Cl.

| H04N 1/50 | (2006.01) |
| H04N 1/58 | (2006.01) |
| G06K 15/16 | (2006.01) |
| G06F 3/12 | (2006.01) |
| H04N 1/00 | (2006.01) |
| H04N 1/60 | (2006.01) |
| G06K 15/12 | (2006.01) |
| G06K 15/02 | (2006.01) |
| H04N 1/29 | (2006.01) |
| G06K 15/14 | (2006.01) |

(52) U.S. Cl.
CPC ....... *H04N 1/00204* (2013.01); *H04N 1/00233* (2013.01); *H04N 1/00254* (2013.01); *H01N 1/00408* (2013.01); *H04N 1/00474* (2013.01); *H04N 1/0048* (2013.01); *H04N 1/00567* (2013.01); *H04N 1/00925* (2013.01); *H04N 1/603* (2013.01); *G06K 15/129* (2013.01); *G06K 15/1882* (2013.01); *G06F 3/1208* (2013.01); *G06F 3/1256* (2013.01); *G06F 3/1281* (2013.01); *G06F 3/1285* (2013.01)
USPC .......................... 358/3.24; 358/1.15; 358/501

(58) Field of Classification Search
USPC .............. 358/1.9, 3.24, 3.26, 1.12–1.15, 501, 358/504, 518, 540, 401, 406, 468, 296, 358/300; 399/9, 14
See application file for complete search history.

(56) References Cited

U.S. PATENT DOCUMENTS

| 4,591,884 A * | 5/1986 | Miyamoto et al. ............ 347/153 |
| 6,977,742 B2 * | 12/2005 | Harper ......................... 358/1.15 |
| 2005/0024411 A1 | 2/2005 | Takenouchi et al. |
| 2005/0179921 A1 * | 8/2005 | Brossman et al. ........... 358/1.13 |

* cited by examiner

*Primary Examiner* — Scott A Rogers
(74) *Attorney, Agent, or Firm* — Oliff & Berridge, PLC

(57) ABSTRACT

An image forming apparatus includes a determination unit and a restriction unit. The determination unit determines an image forming capability of each of the image forming apparatus and a different image forming apparatus, an image being formed on a printing medium that is transported between the image forming apparatus and the different image forming apparatus. The restriction unit restricts an image forming operation of the image forming apparatus when the determination unit determines that the image forming capability of any one of the image forming apparatus and the different image forming apparatus is to be lower than an image forming capability of the other one of the image forming apparatus and the different image forming apparatus when independently performing an operation to form an image on the printing medium.

13 Claims, 11 Drawing Sheets

DETERMINING CAPABILITY AND AFFECT OF UPSTREAM AND DOWNSTREAM IMAGE FORMING DEVICES AND RESTRICTING OPERATION ACCORDINGLY

CROSS-REFERENCE TO RELATED APPLICATIONS

This application is based on and claims priority under 35 USC 119 from Japanese Patent Application No. 2010-243348 filed Oct. 29, 2010.

BACKGROUND

Technical Field

The present invention relates to image forming apparatuses and computer readable media.

SUMMARY

According to an aspect of the invention, there is provided an image forming apparatus including: a determination unit that determines an image forming capability of each of the image forming apparatus and a different image forming apparatus, an image being formed on a printing medium that is transported between the image forming apparatus and the different image forming apparatus; and a restriction unit that restricts an image forming operation of the image forming apparatus when the determination unit determines that the image forming capability of any one of the image forming apparatus and the different image forming apparatus is to be lower than an image forming capability of the other one of the image forming apparatus and the different image forming apparatus when independently performing an operation to form an image on the printing medium.

BRIEF DESCRIPTION OF THE DRAWINGS

Exemplary embodiments of the present invention will be described in detail based on the following figures, wherein.

DETAILED DESCRIPTION

An image forming system according to a first exemplary embodiment of the invention is described below.

Figure 1:
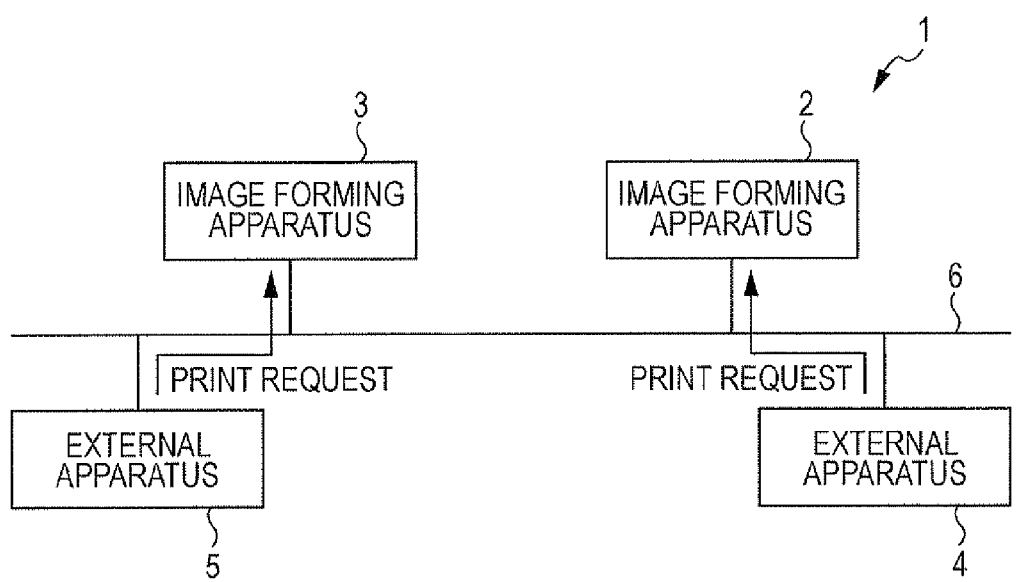
FIG. 1 is a block diagram illustrating the configuration of an image forming system in accordance with a first exemplary embodiment of the invention.

FIG. 1 is a schematic diagram illustrating the configuration of an image forming system 1. The image forming system 1 includes, as shown in FIG. 1, first and second image forming apparatuses 2 and 3 and first and second external apparatuses 4 and 5. The first and second image forming apparatuses 2 and 3 can communicate with the first and second external apparatuses 4 and 5 via a wired or wireless communication medium 6, such as a local area network (LAN), the Internet, or a general public switched network.

The first and second external apparatuses 4 and 5 are, for example, personal computers (PCs), and send print requests generated by a user by operating the first and second external apparatuses 4 and 5 to the first and second image forming apparatuses 2 and 3. The first and second image forming apparatuses 2 and 3 form images on printing media in response to the received print requests. In the first exemplary embodiment, two image forming apparatuses and two external apparatuses are disposed. However, three or more image forming apparatuses and three or more external apparatuses may be disposed.

In the first exemplary embodiment, the first image forming apparatus 2 is configured to form monochrome images on printing media, while the second image forming apparatus 3 is configured to form color images on printing media. With this configuration, the user operates the first or second external apparatus 4 or 5 to allow the first or second image forming apparatus 2 or 3 to perform monochrome printing or color printing.

In this image forming system 1, the first and second image forming apparatuses 2 and 3 are connected to each other in a multiple manner in the transport direction of printing media to form a multiple printer system. With this configuration, they can perform multiple printing in response to a print request.

The "multiple printer system" or the "multiple configuration" is a system in which, at least two independent image forming apparatuses, which can independently perform a printing operation, are used to perform double printing on the front side and the back side of a printing medium. The term "multiple printing" refers to a printing operation performed by using this multiple printer system.

Figure 2:
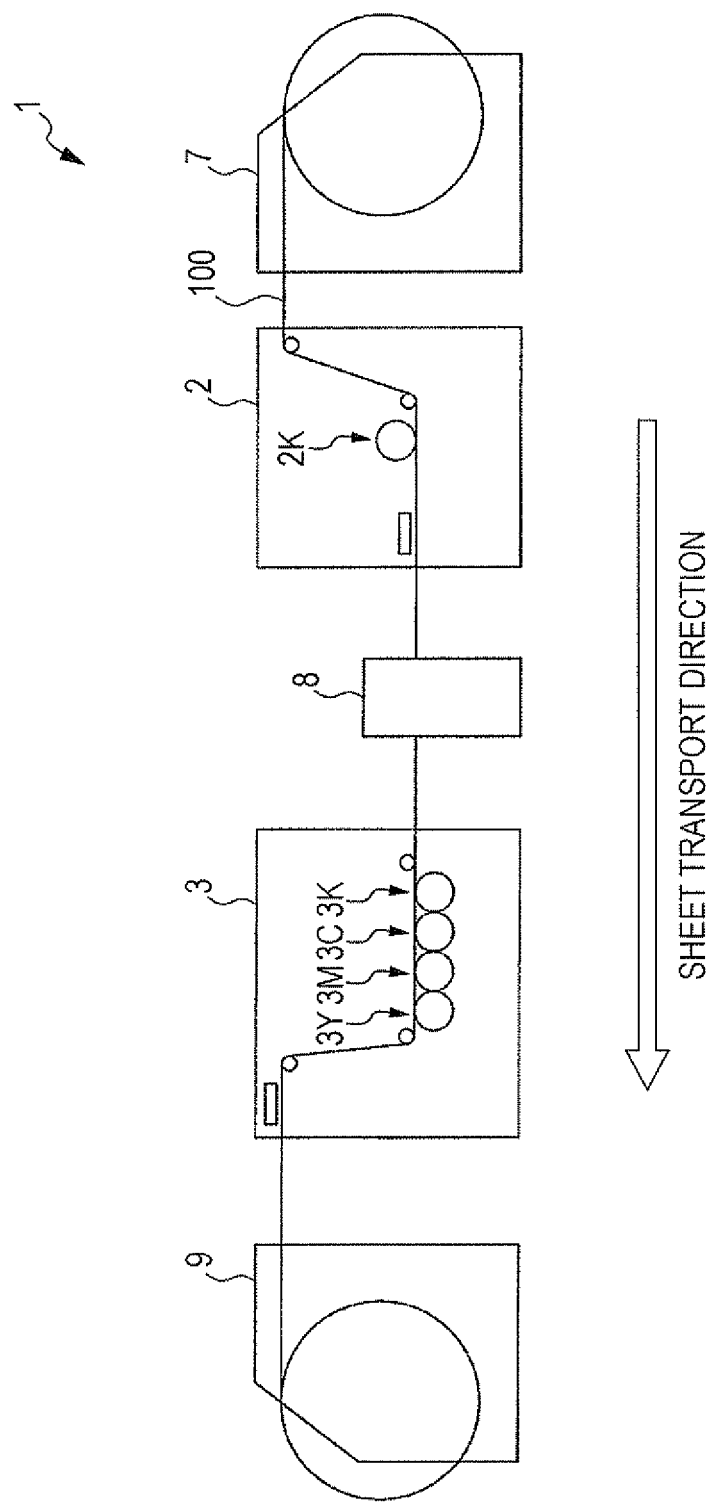
FIG. 2 illustrates an image forming system configured as a multiple printer system.

FIG. 2 illustrates the multiple configuration of the image forming system 1 as a multiple printer system. The image forming system 1 configured as a multiple printer system, as shown in FIG. 2, includes not only the first and second image forming apparatuses 2 and 3, but also a feeder 7, a reversing device 8, and a postprocessing device 9. In this image forming system 1 configured as a multiple printer system, it is possible to determine as desired which image forming apparatus, i.e., the first image forming apparatus 2 or the second image forming apparatus 3, is disposed on the upstream side or the downstream side. In the first exemplary embodiment shown in FIG. 2, however, the first image forming apparatus 2 is disposed on the upstream side, and the second image forming apparatus 3 is disposed on the downstream side.

The feeder 7 continuously supplies a printing medium (continuous paper) 100 to the first image forming apparatus 2 disposed on the upstream side (hereinafter also referred to as an "upstream image forming apparatus"). In this embodiment, the feeder 7 accommodates the continuous paper 100 therein such that the continuous paper 100 is wound in the form of a roll, and supplies the continuous paper 100 to the first image forming apparatus 2 disposed on the upstream side (downstream side as viewed from the feeder 7).

As described above, the first image forming apparatus 2 is configured to form monochrome images. More specifically, the first image forming apparatus 2 is configured to form color images according to an electrophotographic system. Accordingly, the first image forming apparatus 2 includes an image station 2K, which forms a black (hereinafter simply referred to as "K") color image, disposed on the sheet transport path, and forms monochrome images on the continuous paper 100 transported on the transport path. The first image forming apparatus 2 supplies the continuous paper 100 on which an image has been formed to the reversing device 8.

The reversing device 8 is disposed on the transport path of the continuous paper 100 between the first image forming apparatus 2 and the second image forming apparatus 3. The reversing device 8 reverses the side of the continuous paper 100 on which an image has been printed on the front side by the first image forming apparatus 2 and supplies the continuous paper 100 to the second image forming apparatus 3.

As described above, the second image forming apparatus 3 is configured to form color images. More specifically, in this exemplary embodiment, the second image forming apparatus 3 forms color images according to an electrophotographic system, and the printing system of the second image forming apparatus 3 is a multi-transfer tandem electrophotographic system. Accordingly, in the second image forming apparatus 3, along the sheet transport path, an image station 3K for forming K color images, an image station 3C for forming cyan (hereinafter simply referred to as "C") color images, an image station 3M for forming magenta (hereinafter simply referred to as "M") color images, and an image station 3Y for forming yellow (hereinafter simply referred to as "Y") color images are sequentially disposed from the upstream side in the sheet transport direction. The continuous paper 100 sequentially moves on the image stations 3K, 3C, 3M, and 3Y while passing through the transport path, thereby forming toner images of the K, C, M, and Y colors on the continuous paper 100 in the state in which they are superposed on each other. As a result, a color image is formed on the continuous paper 100. The second image forming apparatus 3 supplies the continuous paper 100 to the postprocessing device 9.

The postprocessing device 9 performs necessary postprocessing on the continuous paper 100 on which images have been formed after passing through the first and second image forming apparatuses 2 and 3. For example, the postprocessing device 9 separates sheets forming the continuous paper 100 and stacks the separated sheets with the front sides up.

Figure 3:
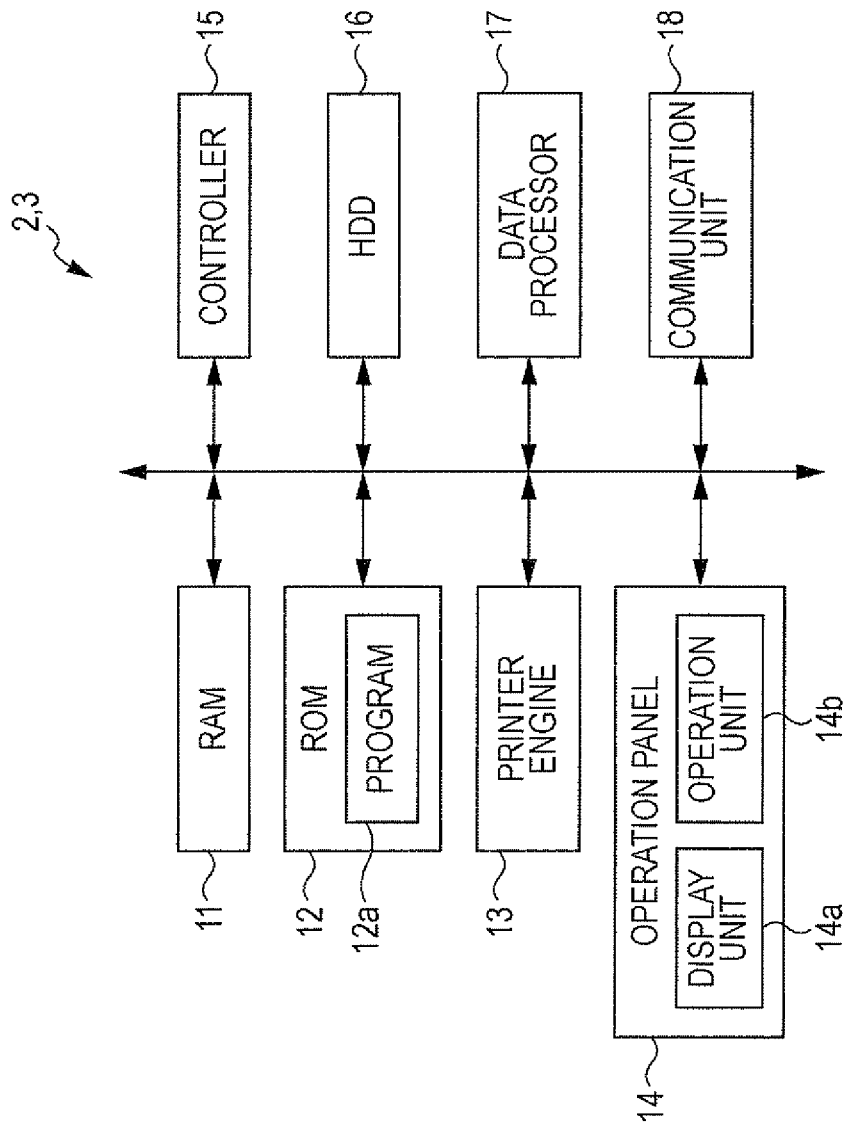
FIG. 3 is a block diagram illustrating the configuration of an image forming apparatus.

FIG. 3 illustrates an example of the first or second image forming apparatus 2 or 3. In this exemplary embodiment, the configuration of the first image forming apparatus 2 is substantially the same as that of the second image forming apparatus 3, except that the first image forming apparatus 2 performs monochrome image formation and the second image forming apparatus 3 performs color image formation. A description is given below, assuming that the configuration shown in FIG. 3 is the configuration of the first image forming apparatus 2.

The first image forming apparatus 2 includes, as shown in FIG. 3, a random access memory (RAM) 11, a read only memory (ROM) 12, a printer engine 13, an operation panel 14, a controller 15, a memory (hard disk drive (HDD)) 16, a data processor 17, and a communication unit 18.

The controller 15 controls the entire first image forming apparatus 2. The ROM 12 stores a control program 12a executed by, for example, the controller 15 or the data processor 17, and various data. The RAM 11 is used as, for example, a work area, used by the controller 15.

The control program 12a is set at the time of manufacture of the first image forming apparatus 2. Alternatively, the control program 12a may be set by being downloaded via a communication medium, such as the Internet, or by being read from a storage medium storing the control program 12a. The memory 16 stores various data, such as image data.

The data processor 17 performs processing, such as encoding, decoding, enlarging, and reducing, on image data.

The operation panel 14 includes a display unit (display screen) 14a that displays information which is given to a user and an operation unit 14b from which a user inputs instructions by operating the operation unit 14b. The display unit 14a and the operation unit 14b are integrally formed. The operation panel 14 is a touch-panel operation unit.

The printer engine 13 forms images on the basis of image data included in a print request. In the first image forming apparatus 2, the printer engine 13 includes the image station K for forming K color images. In the second image forming apparatus 3, the printer engine 13 includes the image stations 3K, 3C, 3M, and 3Y for forming K color images, C color images, M color images, and Y color images, respectively.

The communication unit 18 is used for allowing the first image forming apparatus 2 to communicate with the external apparatuses 4 and 5 via the communication medium 6.

In the multiple printer system in which multiple printing is performed by the use of different types of image forming apparatuses, that is, the first image forming apparatus 2 for performing monochrome printing and the second image forming apparatus 3 for performing color printing, there may be a case where the image forming capability is not as high as it should be depending on the arrangement of the image forming apparatuses in the transport path of the printing medium. More specifically, it is now assumed that the second image forming apparatus 3 for performing color printing is disposed on the upstream side of the transport path and that the first image forming apparatus 2 for performing monochrome printing is disposed on the downstream side of the transport path (such an arrangement is opposite to that shown in FIG. 2). In this case, since many colors are used for image formation in the second image forming apparatus 3 disposed on the upstream side, the printing medium transported to the first image forming apparatus 2 disposed on the downstream side may be deformed, which makes the printed surface uneven. In the flash fixing method in which, with the application of light to toner, the toner is caused to melt and to be fixed to the printing medium, the printing medium may shrink. If the flash fixing method is employed in the second image forming apparatus 3, the first image forming apparatus 2 forms images on the shrunk printing medium transported from the second image forming apparatus 3, which gives rise to the poor image quality of printed matter. In this manner, the image forming capability may be impaired.

In contrast, in this exemplary embodiment, even if the image forming system 1 is configured as a multiple printer system, the formation of images comparable to that when the image forming system 1 is not configured as a multiple printer system is implemented.

Figure 4:
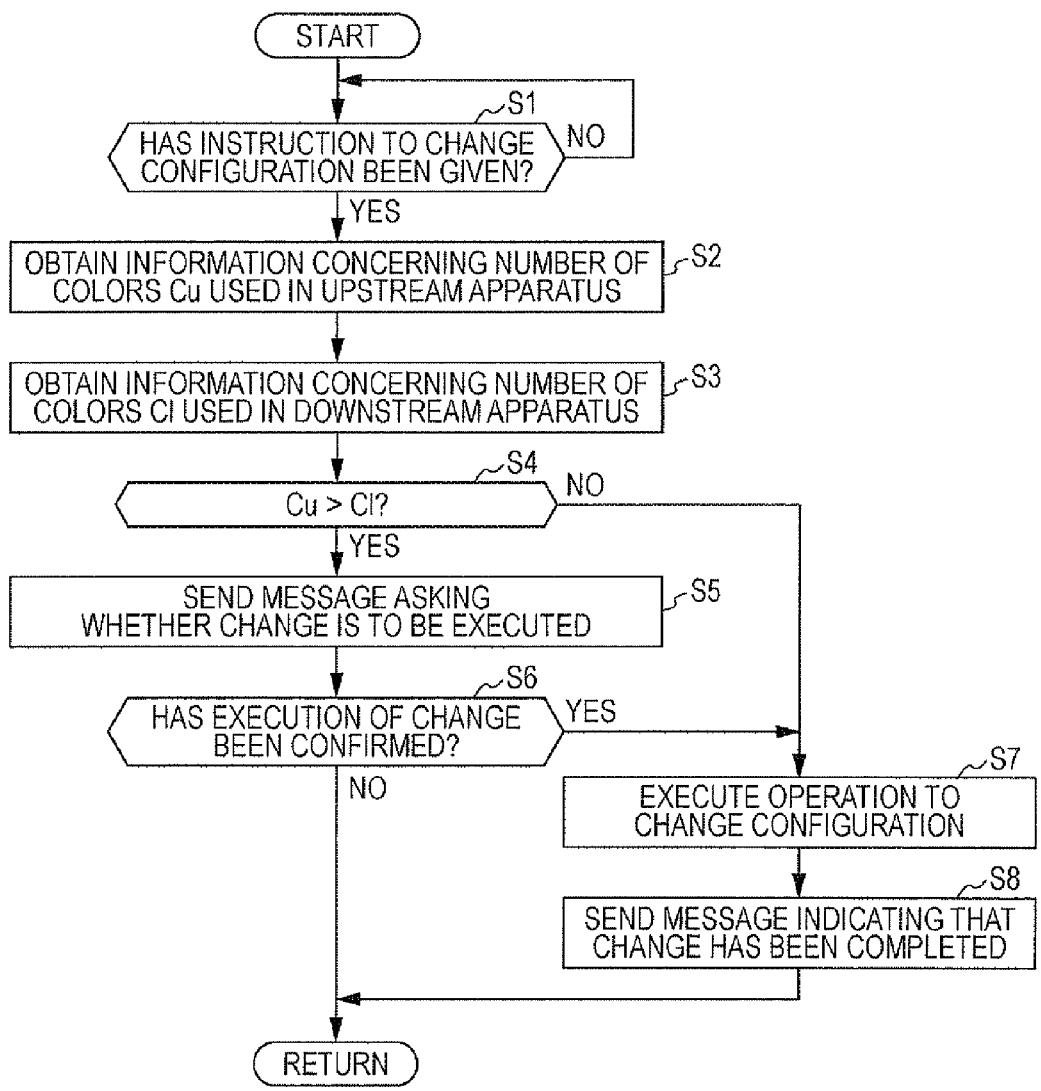
FIG. 4 is a flowchart illustrating processing performed by an image forming apparatus.

FIG. 4 is a flowchart illustrating processing performed by such an image forming apparatus. In this operation, the image forming apparatus is the first image forming apparatus 2 or the second image forming apparatus 3, and more specifically, the controller 15 performs the processing shown in FIG. 4.

In step S1, as shown in FIG. 4, the controller 15 determines whether an instruction to change the configuration of the image forming apparatus 2 or 3 has been given by the user on the operation panel 14. That is, the controller 15 determines whether there has been an instruction to change the configuration of the image forming apparatus 2 or 3 to form a multiple printer system. For example, an instruction to change the configuration of the image forming apparatus 2 or 3 is to form a multiple printer system by connecting plural image forming apparatuses which are independently operated, or is to change the currently set configuration of a multiple printer system.

Figure 5:
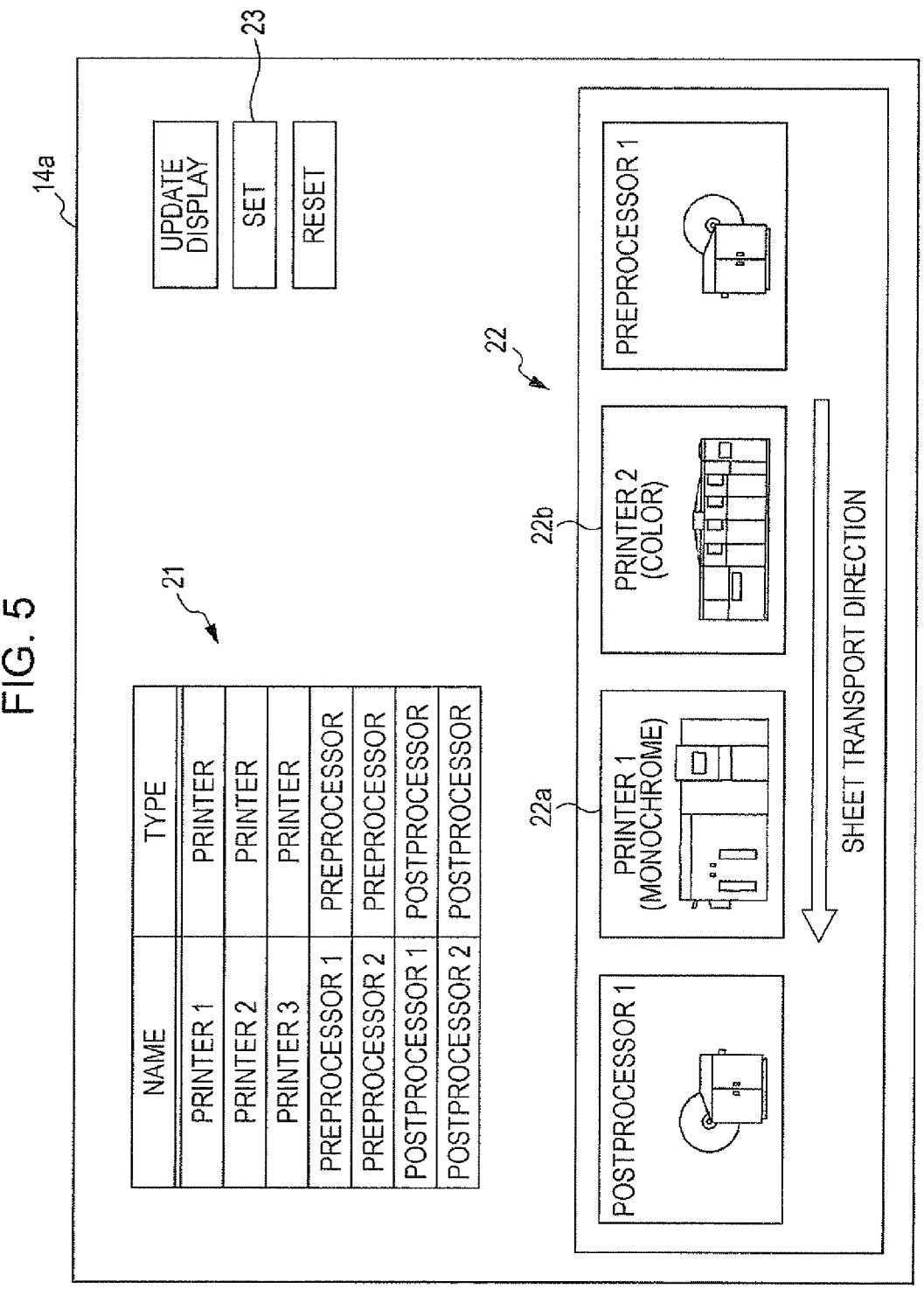
FIG. 5 illustrates a display example of a display unit that allows a user to give an instruction to change the configuration.

FIG. 5 illustrates a display example of the display unit 14a that allows a user to give an instruction to change the printer configuration. In the display unit 14a, a device list 21 of devices that can be configured as a multiple printer system and a device group 22 of currently selected devices are shown. In this display example, Preprocessor 1, Printer 2 (corresponding to the second image forming apparatus 3), Printer 1 (corresponding to the first image forming apparatus 2), and Postprocessor 1 have been selected from the device list 21 and are disposed in this order from the upstream side to the downstream side of the sheet transport direction. If, for example, the first image forming apparatus 2 performs this processing, the first image forming apparatus 2 is shown as Printer 1 in this display unit 14a.

Figure 6:
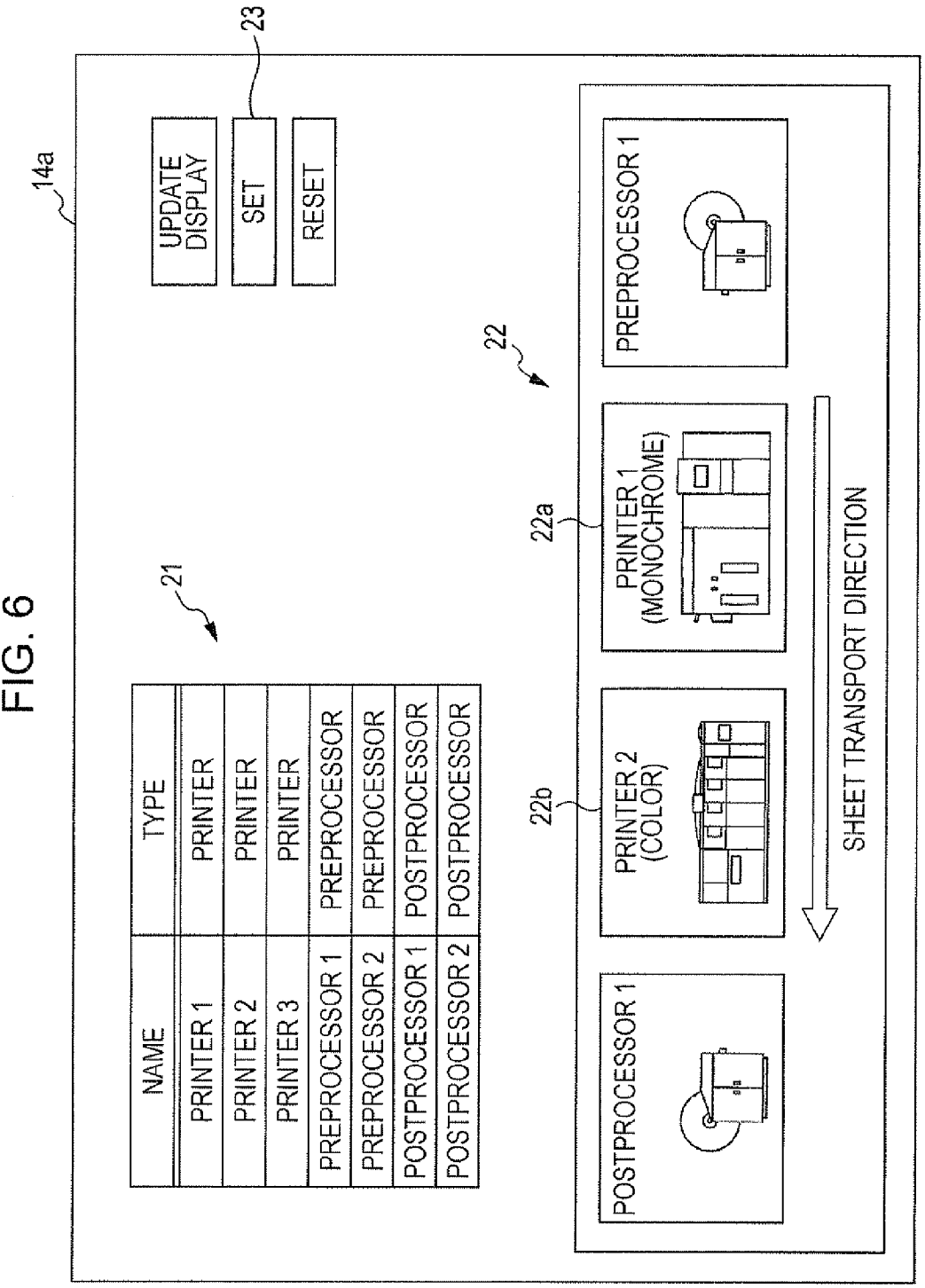
FIG. 6 illustrates a change in the position of devices in a display unit.

Since the operation panel 14 uses a touch-panel system, the positions of the devices in the sheet transport direction can be changed by the user touching the devices displayed in the display unit 14a. For example, if the user touches a display 22a of Printer 1 or a display 22b of Printer 2 displayed in the display unit 14a with a finger to change the position of the devices, Printer 2 can be displayed, as shown in FIG. 6, on the downstream side in the sheet transport direction with respect to the position of Printer 1.

When the user operates a setting button display 23 in the display unit 14a, the controller 15 determines in step S1 that there has been an instruction to change the configuration of the image forming apparatus to form a multiple printer system. The controller 15 then proceeds to step S2.

In step S2, the controller 15 obtains information concerning the number of colors Cu used in the image forming apparatus (the first image forming apparatus 2 or the other image forming apparatus) disposed on the upstream side in the multiple printer system.

In step S3, the controller 15 obtains information concerning the number of colors Cl used in the image forming apparatus (the first image forming apparatus 2 or the other image forming apparatus which is not disposed on the upstream side) disposed on the downstream side (such an apparatus is hereinafter also referred to as a "downstream image forming apparatus") in the multiple printer system.

In order to allow one image forming apparatus to obtain information concerning the number of colors used in the other image forming apparatus, the image forming apparatus may store such color information in advance, or may request the other image forming apparatus to send the color information. Alternatively, the color information may be obtained from an apparatus (for example, an information management apparatus, such as a server) operating within the communication medium 6.

In step S4, the controller 15 determines whether the number of colors Cu used in the upstream image forming apparatus obtained in step S2 is greater than the number of colors Cl used in the downstream image forming apparatus obtained in step S3. If the result of step S4 is YES, the controller 15 proceeds to step S5. If the controller 15 determines in step S4 that the number of colors Cu is equal to or smaller than the number of colors Cl, the controller 15 proceeds to step S7.

In step S5, the controller 15 sends a message asking whether the change of the configuration is to be executed by displaying the message on the display unit 14a. Then, the controller 15 determines in step S6 whether the user has performed an operation to confirm the execution of the change of the configuration. If the result of step S6 is YES, the controller proceeds to step S7. If the controller 15 determines in step S6 that the user has not performed an operation to confirm the execution of the change of the configuration, for example, if the user cancels the execution of the change of the configuration or resets the change of the configuration, the controller 15 completes the processing shown in FIG. 4.

Figure 7:
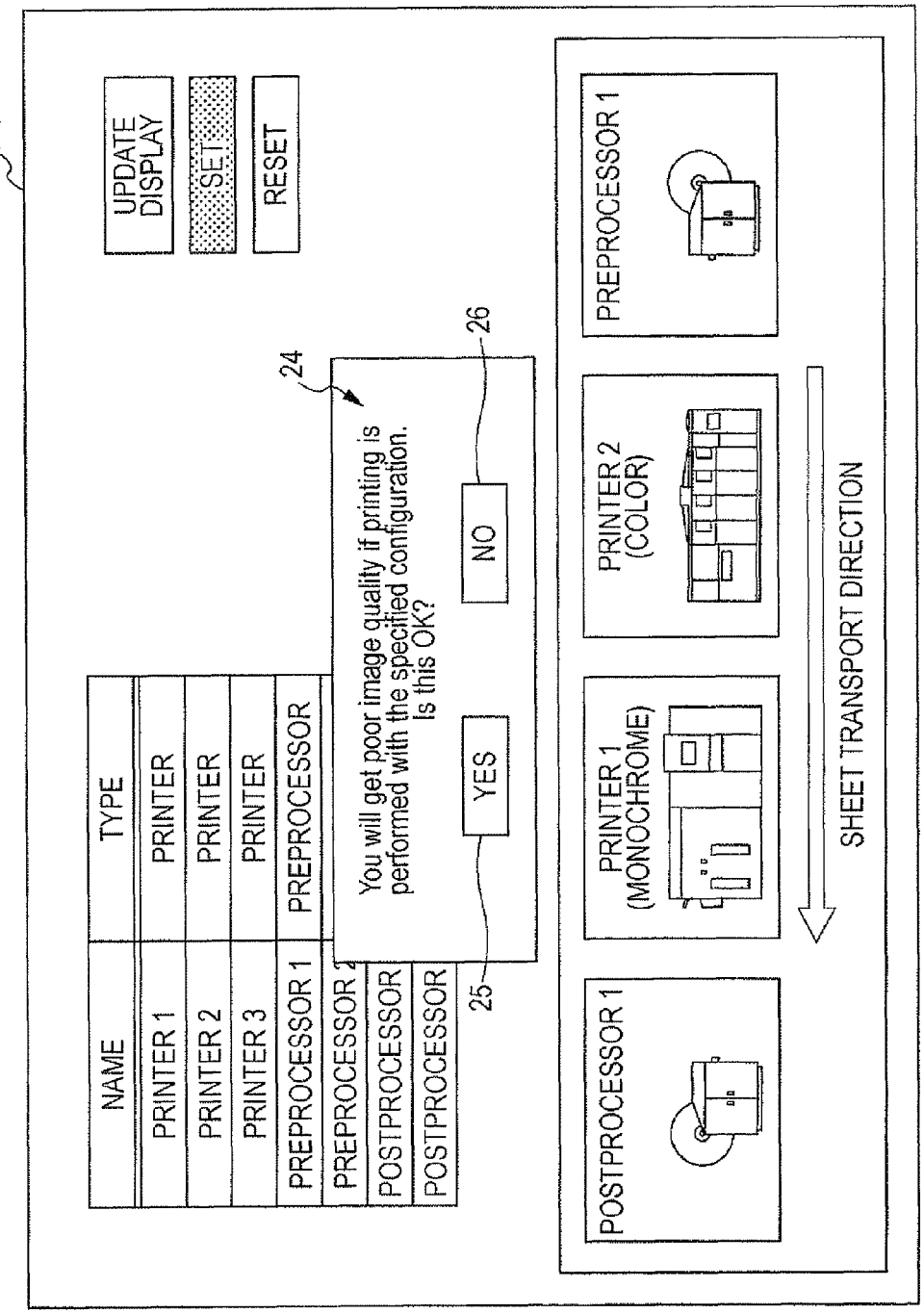
FIG. 7 illustrates a message asking whether a change made on a display unit is to be executed.

FIG. 7 illustrates an example of such a message. For example, in the display unit 14a, a message 24, such as "You will get poor image quality if printing is performed with the specified configuration. Is this OK?", is given as the message asking whether the change of the configuration is to be executed. In the display unit 14a, a "YES" button 25 and a "NO" button 26 that allow the user to instruct or cancel the execution of the change of the configuration are shown. If the user selects the "YES" button 25, the controller 15 proceeds to step S7. If the user selects the "NO" button 26, the controller 15 completes the processing.

In step S7, the controller 15 executes an operation to change the configuration. Then, in step S8, the controller 15 sends a message, by the use of the display unit 14a, indicating that the change has been completed. The controller 15 then completes the processing shown in FIG. 4.

Figure 8:
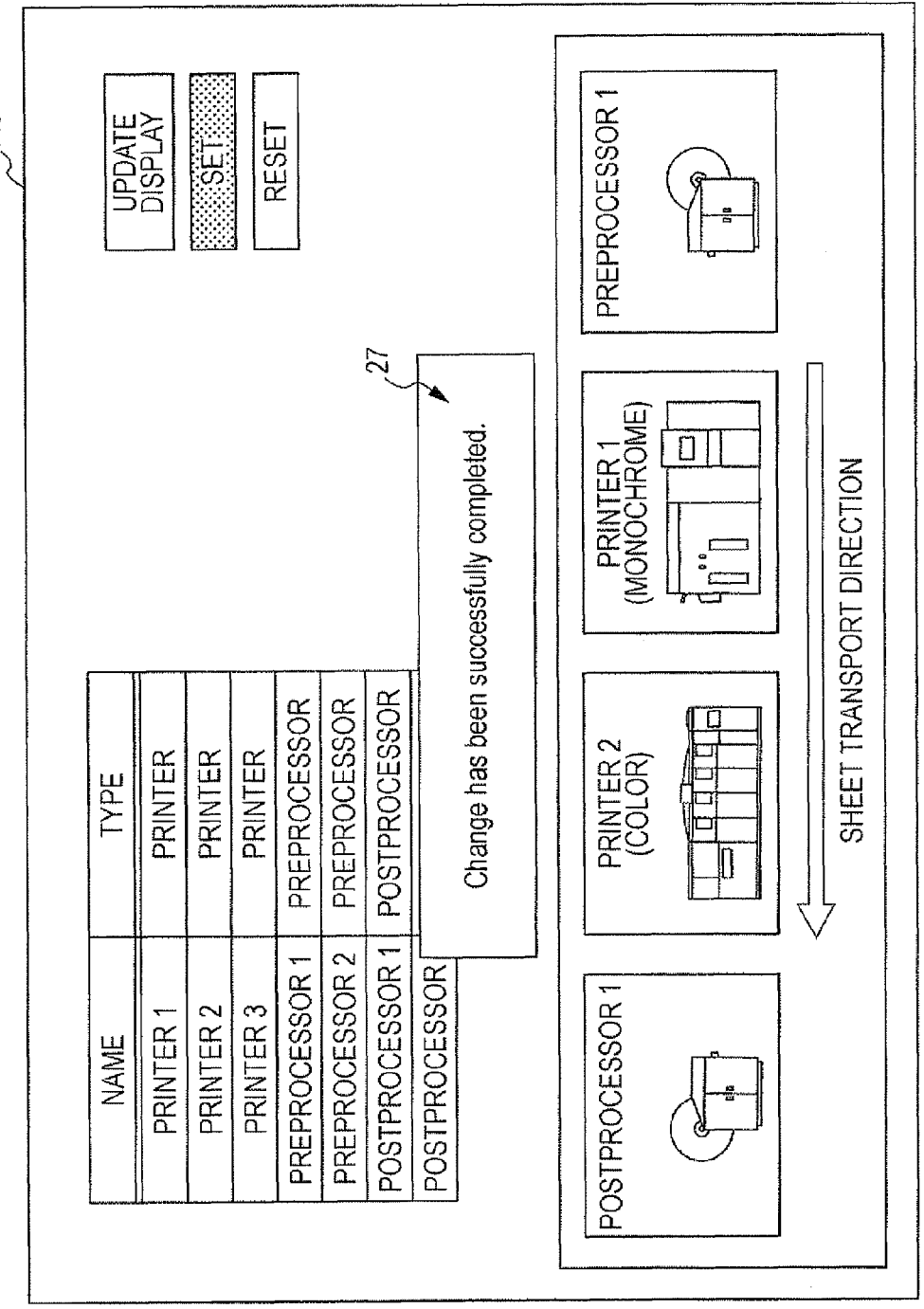
FIG. 8 illustrates a message indicating that a change made on a display unit has been completed.

FIG. 8 illustrates an example of the message in response to the display example of the display unit 4a shown in FIG. 5. As the message indicating that the change has been completed, for example, a message 27 "Change has been successfully completed", is displayed in the display unit 4a.

The operation of the image forming system 1 having the above-described configuration is as follows. In response to an instruction to change the configuration of the system given by a user by operating the operation panel 14, an image forming apparatus (the first image forming apparatus 2 or the second image forming apparatus 3) obtains information concerning the number of colors used in each of the image forming apparatuses (steps S1 through S3). If the number of colors Cu used in the upstream image forming apparatus is equal to or smaller than the number of colors Cl used in the downstream image forming apparatus, the image forming apparatus executes an operation to change the configuration and informs the user that the change has been completed (steps S4, S7, and S8). On the other hand, if the number of colors Cu is greater than the number of colors Cl, the image forming apparatus does not execute an operation to change the configuration immediately, but sends a message asking whether the change of the configuration is to be executed (steps S4 and S5). If it is determined that the change is to be executed, the image forming apparatus executes an operation to change the configuration and sends a message indicating that the change has been completed (steps S6 through S8).

With this operation, in the image forming system 1, when the first and second image forming apparatuses 2 and 3 are configured as a multiple printer system, if the number of colors Cu used in the upstream image forming apparatus is greater than the number of colors Cl used in the downstream image forming apparatus, a message asking whether the change of the configuration is to be executed is given. Accordingly, multiple printing does not start immediately in response to an instruction to change the configuration.

Thus, the downstream image forming apparatus can be prevented from forming images under the circumstances where the image forming capability of the downstream image forming apparatus would be impaired because of the use of many colors in the upstream image forming apparatus. It is also possible to prevent the downstream image forming apparatus from forming images on a deformed printing medium, which would otherwise give rise to a poor quality of printed matter and provide undesirable printed matter to a user.

In this manner, in the image forming system 1 configured as a multiple printer system, the formation of images comparable to that when the image forming system 1 is not configured as a multiple printer system is implemented.

An example of a modification made to the first exemplary embodiment is as follows. When the number of colors Cu used in the upstream image forming apparatus is greater than the number of colors Cl used in the downstream image forming apparatus, the image forming apparatus does not change the configuration of the printer system to a multiple printer system without informing the user of the cancellation of such a change (for example, by terminating the processing for changing the configuration of the printer system). In this manner, the operation of the image forming apparatus can be restricted.

A second exemplary embodiment of the invention is described below. In the second exemplary embodiment, plural image forming apparatuses having a master-sub relationship in a multiple printer system execute processing in accordance with this master-sub relationship.

More specifically, when the image forming system 1 is not configured as a multiple printer system, and when each image forming apparatus is configured to independently perform an operation, each image forming apparatus can receive a print request sent from an external apparatus under the normal conditions and forms images independently on the basis of the print request. That is, if the image forming system 1 is not configured as a multiple printer system, a print request input port is provided for each image forming apparatus.

In contrast, when the image forming system 1 is configured as a multiple printer system, among plural image forming apparatuses, one image forming apparatus serves as a master apparatus (hereinafter referred to as the "master image forming apparatus"), and the other image forming apparatus serves as a sub apparatus (hereinafter referred to as the "sub image forming apparatus"). Then, only the master image forming apparatus receives a print request sent from an external apparatus, and the master image forming apparatus and the sub image forming apparatus perform an operation on the basis of the received print request. That is, when the image forming system 1 is configured as a multiple printer system, only one print request input port is provided.

Even when the image forming system 1 is configured as a multiple printer system, there may be a case where a print request is sent to the sub image forming apparatus from an external apparatus. In this case, if the sub image forming apparatus ignores the print request without receiving it, the advantages of the image formation of the image forming system 1 which is not configured as a multiple printer system are impaired.

In contrast, in the second exemplary embodiment, in the image forming system 1 which is configured as a multiple printer system, even when there is a print request sent to the sub image forming apparatus, the formation of images comparable to that when the image forming system 1 is not configured as a multiple printer system is implemented.

Figure 9:
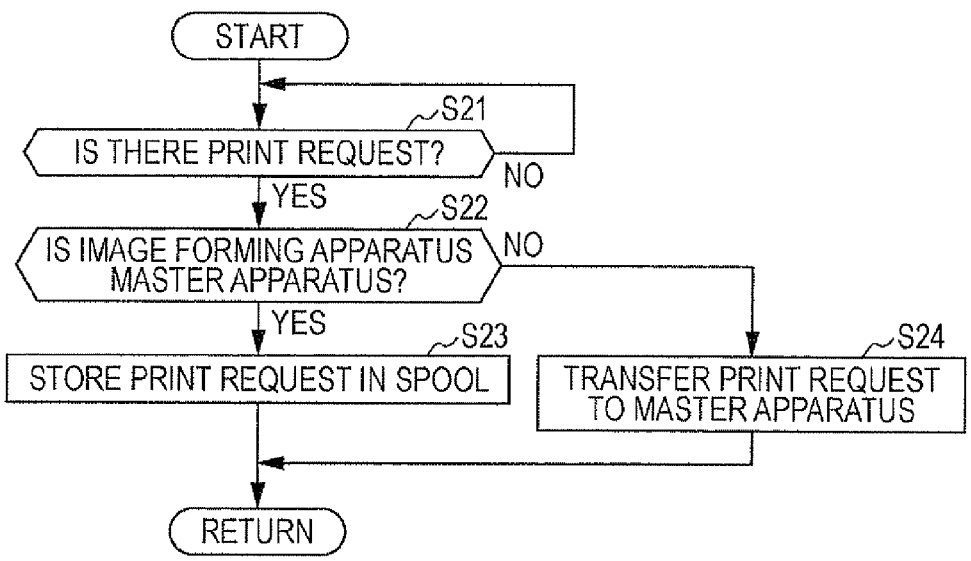
FIG. 9 is a flowchart illustrating processing performed by an image forming apparatus in accordance with a second exemplary embodiment of the invention.

FIG. 9 is a flowchart illustrating processing executed by an image forming apparatus. In this operation, the image forming apparatus is the first image forming apparatus 2 or the second image forming apparatus 3. More specifically, the controller 15 executes this processing.

In step S21, the controller 15 determines whether there is a print request (whether a print request has been sent). If the result of step S21 is YES, the controller 15 proceeds to step S22.

In step S22, the controller 15 determines whether the image forming apparatus, i.e., the first image forming apparatus 2 or the second image forming apparatus 3 is the master image forming apparatus. If the controller 15 determines that the first image forming apparatus 2 or the second image forming apparatus 3 is the master image forming apparatus, that is, the image forming apparatus is an apparatus provided with a print request input port, the controller 15 proceeds to step S23. If the controller 15 determines that the image forming apparatus is not a master apparatus, i.e., the image forming apparatus is a sub image forming apparatus without a print request input port, the controller 15 proceeds to step S24.

In step S23, the controller 15 stores the print request in a spool. The controller 15 then completes the processing shown in FIG. 9.

In step S24, the controller 15 transfers the print request to the master image forming apparatus. The controller 15 then completes the processing. Upon receiving the print request from the sub image forming apparatus, the master image forming apparatus stores the transferred print request in the spool.

The operation of the image forming system 1 having the above-described configuration is as follows. When the image forming apparatus is a master image forming apparatus, it stores a print request sent from an external apparatus in a spool (steps S21 through S23). Accordingly, the image forming system 1 operates the individual image forming apparatuses configured as a multiple printer system to perform multiple printing on the basis of the print request received by the master image forming apparatus.

When the image forming apparatus is a sub image forming apparatus, it transfers a print request sent from an external apparatus to the master image forming apparatus (steps S21, S22, and S24). Upon receiving the print request transferred from the sub image forming apparatus by the master image forming apparatus, the image forming system 1 operates the individual image forming apparatuses configured as a multiple printer system to perform multiple printing on the basis of the print request received by the master image forming apparatus.

Figure 10:
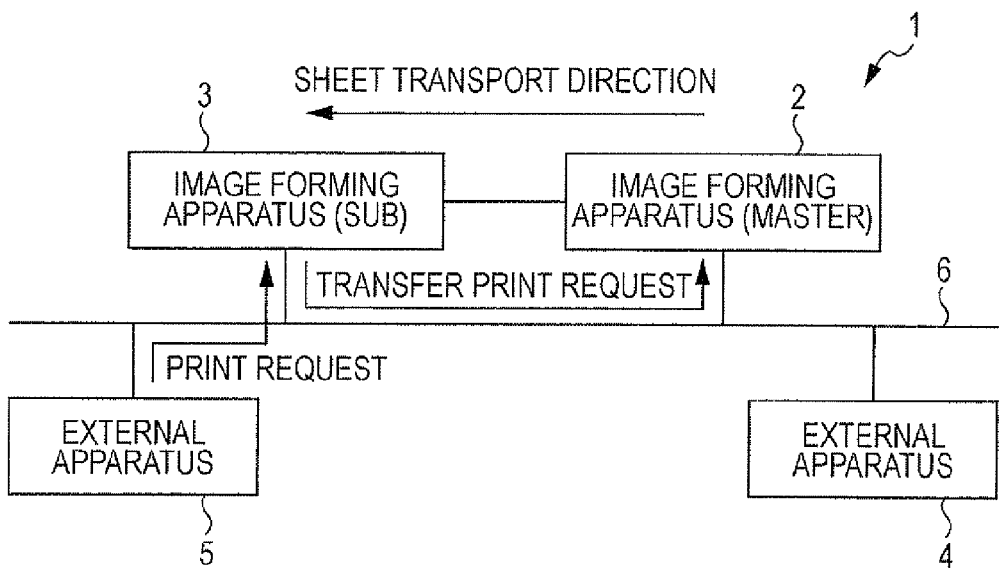
FIG. 10 illustrates an operation performed by an image forming system configured as a multiple printer system when a print request is sent to a sub image forming apparatus.

FIG. 10 illustrates the configuration of the image forming system 1 in which the first image forming apparatus 2, which is an upstream image forming apparatus, serves as a master image forming apparatus, and the second image forming apparatus 3, which is a downstream image forming apparatus, serves as a sub image forming apparatus.

With this configuration, when a print request is transferred from the external apparatus 5, the sub image forming apparatus 3 transfers the print request to the master image forming apparatus 2.

The configuration in which the upstream image forming apparatus serves as the master image forming apparatus is intuitively easy to understand for the user since the master image forming apparatus is disposed on the upstream side of the sheet transport direction.

Figure 11:
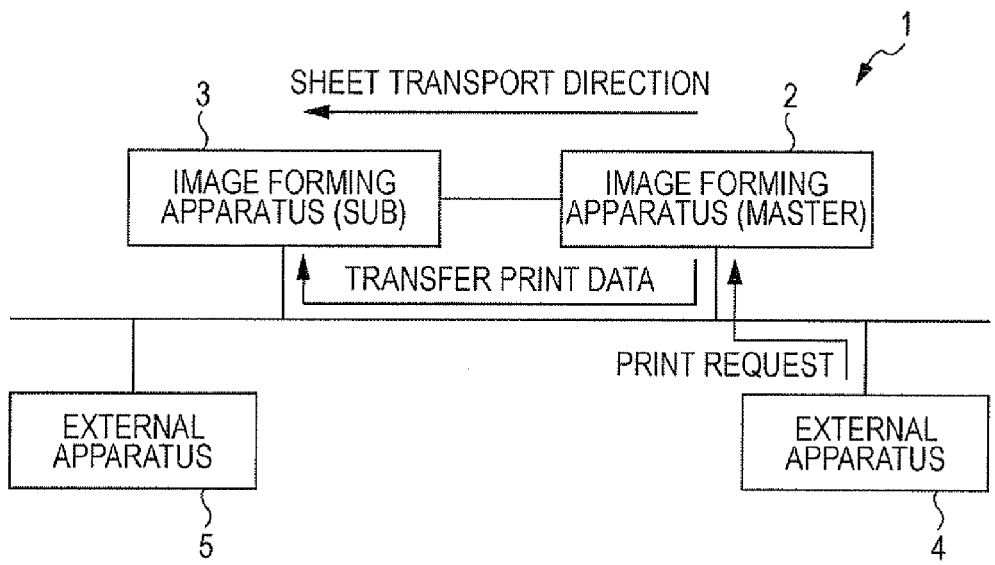
FIG. 11 illustrates an operation performed by an image forming system configured as a multiple printer system when a print request is sent to a master image forming apparatus.

FIG. 11 illustrates an example of an operation when a print request is sent to the master image forming apparatus (upstream image forming apparatus) 2 in the configuration of the image forming system 1 shown in FIG. 10.

When a print request is sent from the external apparatus 4 to the master image forming apparatus 2, as shown in FIG. 11, the image forming system 1 allows the master image forming apparatus 2 to receive the print request and allows the master image forming apparatus 2 and the sub image forming apparatus 3 to perform a multiple printing operation on the basis of the print request. In this case, the master image forming apparatus 2 transfers print data which is included in the print request and which is used for forming images by the sub image forming apparatus 3 to the sub image forming apparatus 3. With this arrangement, the sub image forming apparatus 3 forms images based on the print data on a printing medium which has been subjected to printing in the master image forming apparatus 2 and transferred from the master image forming apparatus 2.

Such a print process applies to the case where a print request is sent to the sub image forming apparatus 3, as shown in FIG. 10. That is, upon receiving a print request from the external apparatus 5, the sub image forming apparatus 3 transfers the print request to the master image forming apparatus 2. Then, the master image forming apparatus 2 transfers print data which is included in the transferred print request and which is used for forming images by the sub image forming apparatus 3 to the sub image forming apparatus 3. With this arrangement, the sub image forming apparatus 3 forms images based on the print data on a printing medium which has been subjected to printing in the master image forming apparatus 2 and transferred from the master image forming apparatus 2.

Thus, in the image forming system 1 configured as a multiple printer system, even when there is a print request to an image forming apparatus which cannot receive the print request, images can be formed on the basis of the print request. As a result, the image forming system 1 which is configured as a multiple printer system implements the formation of images comparable to that when the image forming system 1 is not configured as a multiple printer system.

An example of a modification made to the second exemplary embodiment is as follows. If the image forming apparatus is a sub image forming apparatus, it may send information indicating that printing cannot be performed to an external apparatus (client).

Figure 12:
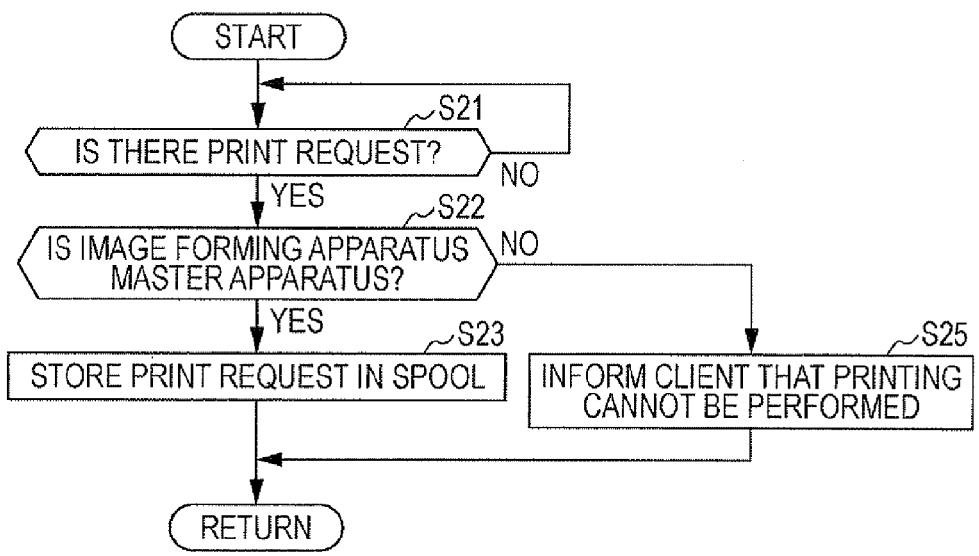
FIG. 12 is a flowchart illustrating another processing performed by an image forming apparatus in accordance with the second exemplary embodiment of the invention.

FIG. 12 is a flowchart illustrating processing reflecting such a modification. Steps of FIG. 12 are the same as those shown in FIG. 9, except for step S25. That is, instead of step S24 shown in FIG. 9, in step S25, the sub image forming apparatus 3 informs an external apparatus which has sent a print request that a print operation cannot be performed.

Figure 13:
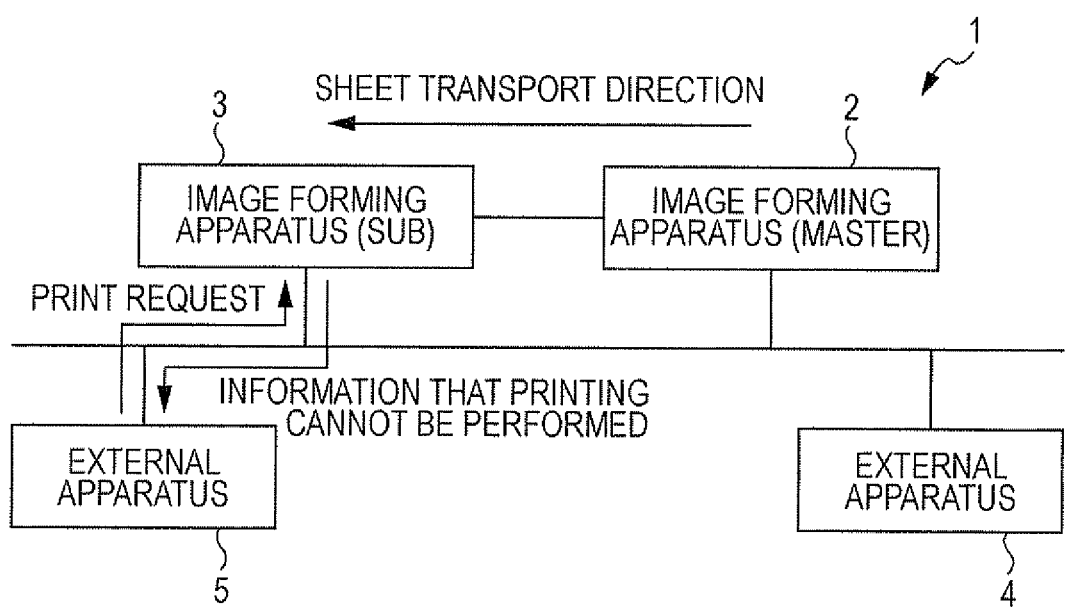
FIG. 13 illustrates an operation performed by an image forming system configured as a multiple printer system when a sub image forming apparatus sends a message to an external apparatus in response to a print request sent from the external apparatus.

FIG. 13 illustrates an operation of a sub image forming apparatus (downstream image forming apparatus) in the image forming system 1 configured as shown in FIG. 10.

Upon receiving a print request from the external apparatus 5 (or the external apparatus 4), as shown in FIG. 13, the sub image forming apparatus 3 informs the external apparatus 5 (or the external apparatus 4) that a printing operation cannot be performed.

With this arrangement, in the image forming system 1, upon receiving information that a printing operation cannot be performed, the external apparatus (or the user) sends a print request again to a master image forming apparatus, which makes it possible to perform image formation on the basis of the print request. That is, in the image forming system 1, information that a printing operation cannot be performed is sent to an external apparatus, and as a result, the execution of image formation based on a print request is implemented.

In the second exemplary embodiment, the master image forming apparatus is an upstream image forming apparatus (monochrome-printing image forming apparatus). However, the master image forming apparatus may be a downstream image forming apparatus (color-printing image forming apparatus). In this case, when a print request is sent from an external apparatus to the upstream image forming apparatus, which serves as the sub image forming apparatus, the upstream image forming apparatus transfers the print request to the downstream image forming apparatus or informs the external apparatus that a printing operation cannot be performed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming device comprising:
   a determination unit that determines an image forming capability of a first image forming apparatus and a second image forming apparatus, an image being formed on a printing medium that is transported between the first image forming apparatus and the second image forming apparatus;
   an acquiring unit that acquires information concerning a number of colors used in the first image forming apparatus and information concerning the number of colors used in the second image forming apparatus; and
   a restriction unit that restricts an image forming operation of the first image forming apparatus when the determination unit determines that the image forming capability of any one of the first image forming apparatus and the second image forming apparatus is to be lower than an image forming capability of the other one of the first image forming apparatus and the second image forming apparatus when independently performing an operation to form an image on the printing medium;
   wherein, when the acquired number of colors used in one of the first image forming apparatus and the second image forming apparatus positioned on an upstream side of the transport direction of the printing medium is greater than the acquired number of colors used in the other one of the first image forming apparatus and the second image forming apparatus positioned on a downstream side of the transport direction of the printing medium, the determination unit determines that the image forming capability of one of the first image forming apparatus and the second image forming apparatus positioned on the downstream side is to be lower than an image forming capability when the one of the first image forming apparatus and the second image forming apparatus positioned on the downstream side independently performs an operation to form an image on the printing medium, and wherein the first image forming apparatus is connected to the second image forming apparatus in a transport direction of a printing medium to form a multiple printer system.

2. The image forming device according to claim 1, wherein the multiple printer system is a system in which, at least two independent image forming apparatuses, which can independently perform a printing operation, are used to perform double printing on the front side and the back side of a printing medium.

3. The image forming device according to claim 1, wherein when one of the first image forming apparatus and the second image forming apparatus positioned on the upstream side of the transport direction of the printing medium forms an image on the printing medium by applying light to toner to be fixed to the printing medium, the determining unit determines that the image forming capability of one of the first image forming apparatus and the second image forming apparatus positioned on the downstream side of the transport direction of the printing medium is to be lower than an image forming capability when the one of the first image forming apparatus and the second image forming apparatus positioned on the downstream side independently performs an operation to form an image on the printing medium.

4. The image forming device according to claim 1, wherein the determining unit performs a determination of the image forming capability of the first image forming apparatus and the second image forming apparatus when an instruction to change a configuration of the first image forming apparatus and the second image forming apparatus is given by a user.

5. The image forming device according to claim 4, wherein the restriction unit restricts the image forming operation of the first image forming apparatus by providing the user with a message asking whether a change of the configuration is to be executed.

6. A non-transitory computer readable medium storing a program causing a computer to execute a process, the process comprising:
   determining an image forming capability of a first image forming apparatus and a second image forming apparatus, an image being formed on a printing medium that is transported between the first image forming apparatus and the second image forming apparatus;
   acquiring information concerning a number of colors used in the first image forming apparatus and information concerning the number of colors used in the second image forming apparatus;
   restricting an image forming operation of the first image forming apparatus when it is determined that the image forming capability of any one of the first image forming apparatus and the second image forming apparatus is to be lower than an image forming capability of the other one of the first image forming apparatus and the second image forming apparatus when independently performing an operation to form an image on the printing medium; and
   determining, when the acquired number of colors used in one of the first image forming apparatus and the second image forming apparatus positioned on an upstream side of the transport direction of the printing medium is greater than the acquired number of colors used in the other one of the first image forming apparatus and the second image forming apparatus positioned on a downstream side of the transport direction of the printing medium, that the image forming capability of one of the first image forming apparatus and the second image forming apparatus positioned on the downstream side is to be lower than an image forming capability when the one of the first image forming apparatus and the second image forming apparatus positioned on the downstream side independently performs an operation to form an image on the printing medium, wherein the first image forming apparatus is connected to the second image forming apparatus in a transport direction of a printing medium to form a multiple printer system.

7. An image forming device comprising:
   a detector that detects whether or not a first image forming apparatus is able to receive a print request, an image being formed on a printing medium on the basis of the print request to be received by the first image forming apparatus or a second image forming apparatus, the printing medium being transported between the first image forming apparatus and the second image forming apparatus;
   an acquiring unit that acquires information concerning a number of colors used in the first image forming apparatus and information concerning the number of colors used in the second image forming apparatus; and
   an operation unit that performs, when the print request is sent to the first image forming apparatus, a preset operation so as to form an image on the basis of the print request, upon detection by the detector that the first image forming apparatus is not able to receive the print request;
   wherein, when the acquired number of colors used in one of the first image forming apparatus and the second image forming apparatus positioned on an upstream side of the transport direction of the printing medium is greater than the acquired number of colors used in the other one of the first image forming apparatus and the second image forming apparatus positioned on a downstream side of the transport direction of the printing medium, it is determined that the image forming capability of one of the first image forming apparatus and the second image forming apparatus positioned on the downstream side is to be lower than an image forming capability when the one of the first image forming apparatus and the second image forming apparatus positioned on the downstream side independently performs an operation to form an image on the printing medium, and wherein the first image forming apparatus is connected to the second image forming apparatus in a transport direction of a printing medium to form a multiple printer system.

8. The image forming device according to claim 7, wherein the first image forming apparatus is connected to the second image forming apparatus in a transport direction of a printing medium to form a multiple printer system.

9. The image forming device according to claim 8, wherein the multiple printer system is a system in which, at least two independent image forming apparatuses, which can independently perform a printing operation, are used to perform double printing on the front side and the back side of a printing medium.

10. The image forming device according to claim 7, wherein the operation unit transfers the print request which has been sent to the first image forming apparatus to the second image forming apparatus that is able to receive the print request.

11. A non-transitory computer readable medium storing a program causing a computer to execute a process, the process comprising:
- detecting whether or not a first image forming apparatus is able to receive a print request, an image being formed on a printing medium on the basis of the print request to be received by the first image forming apparatus or a second image forming apparatus, the printing medium being transported between the first image forming apparatus and the second image forming apparatus;
- acquiring information concerning a number of colors used in the first image forming apparatus and information concerning the number of colors used in the second image forming apparatus;
- performing, when the print request is sent to the first image forming apparatus, a preset operation so as to form an image on the basis of the print request, upon detecting that the first image forming apparatus is not able to receive the print request; and
- determining, when the acquired number of colors used in one of the first image forming apparatus and the second image forming apparatus positioned on an upstream side of the transport direction of the printing medium is greater than the acquired number of colors used in the other one of the first image forming apparatus and the second image forming apparatus positioned on a downstream side of the transport direction of the printing medium, that the image forming capability of one of the first image forming apparatus and the second image forming apparatus positioned on the downstream side is to be lower than an image forming capability when the one of the first image forming apparatus and the second image forming apparatus positioned on the downstream side independently performs an operation to form an image on the printing medium,
- wherein the first image forming apparatus is connected to the second image forming apparatus in a transport direction of a printing medium to form a multiple printer system.

12. An image forming device comprising:
- a determination unit that determines whether forming an image on a printing medium of a first image forming apparatus positioned upstream on a printing path negatively affects forming an image on a second image forming apparatus positioned downstream on the printing path; and
- a restriction unit that restricts an image forming operation of the first image forming apparatus if the determination unit determines that forming the image on the printing medium of the first image forming apparatus positioned upstream on the printing path negatively affects forming the image on the second image forming apparatus positioned downstream on the printing path.

13. The image forming apparatus according to claim 12, wherein an instruction to change a configuration of the first image forming apparatus and the second image forming apparatus causes the first image forming apparatus to be positioned downstream and the second image forming apparatus to be positioned upstream with respect to the printing path.

* * * * *